Patented Mar. 24, 1953

2,632,737

UNITED STATES PATENT OFFICE 2,632,737

METHOD OF REACTIVATING COPPER-BEARING CATALYTIC SOLUTIONS

Carlyle J. Stehman, Dayton, Ohio, assignor to Monsanto Chemical Company, St. Louis, Mo., a corporation of Delaware No Drawing. Application January 8, 1951, Serial No. 205,029

6 Claims. (Cl. 252—413)

This invention relates to an improvement in the recovery or reactivation of catalysts used in the production of acrylonitrile by the reaction of acetylene with hydrogen cyanide.

The production of acrylonitrile by the catalytic reaction of acetylene and hydrogen cyanide in the presence of cuprous salt catalysts is described in U. S. Patent Re. 23,265.

The catalytic solution employed in the production of acrylonitrile comprises an aqueous solution of cuprous chloride, alkali metal chlorides, such as sodium and potassium chloride and hydrochloric acid. The reaction conditions prevailing in the system by which acrylonitrile is formed from acetylene and hydrogen cyanide leads to the formation of certain amounts of by-product tars containing impurities derived from the reactants. Such by-product tars and impurities accumulate in the catalytic solution in the form of liquid tars. As a result of such accumulation, the activity of the catalytic solution is gradually lowered and in time becomes so low that its further usefulness is impaired.

It has already been proposed to recover the copper values in the spent catalyst solution by treatment with chlorine, whereby the copper is oxidized to the cupric state. The copper is then recovered by conventional electrolytic means. Such methods, however, are costly and time-consuming.

I have now found that the salt mixture present in the spent catalytic solution may be freed of liquid, tarry bodies, as well as other impurities, and recovered in a form suitable for reuse in the process. According to my invention the water present in the catalytic solution is evaporated so that a substantially water-free salt mass is obtained. The mass which is dry after the removal of water may be a solid, pasty or liquid mixture comprising cuprous and alkali metal chlorides, together with liquid, tarry matter. The substantially anhydrous, tar-containing salt mass is then heated to a temperature sufficiently high to convert the liquid tars into a solid, carbonaceous material. This heating results in a pyrolysis of the liquid tars, converting the liquid tars into solid or non-fluid carbonaceous material. The pyrolysis is preferably carried out by heating the dried salt mass to a temperature of at least 250° C., but below 400° C., and also preferably while maintaining an inert (non-oxidizing) atmosphere over the salt mass during said pyrolysis.

The solid, carbonaceous material which is distributed throughout the salt mass has been found to be insoluble in water or aqueous hydrochloric acid. Accordingly, I treat the salt mass heated as above described either with water or with water acidified with HCl and then either filter or decant the aqueous solution of the salts from the solid, carbonaceous material.

The resulting solution of the mixed salts in water or in aqueous HCl may be adjusted to the proper concentration by the addition of water or additional HCl and then returned to the catalyst chamber for reuse in synthesizing additional acrylonitrile.

Example

A catalyst solution containing the following constituents (the parts being by weight) was prepared and employed for the synthesis of acrylonitrile.

181 parts water
15 parts 37% HCl
41 parts NaCl
111 parts of KCl
231 parts of $Cu_2Cl$ The above solution was placed in the catalyst chamber and used for the production of acrylonitrile over a period of 1,000 hours, at which time the yield of acrylonitrile had decreased to such a point that its use was no longer justified economically. An examination of the solution revealed that it contained a considerable amount of a liquid, tarry material which was in part distributed in finely divided form throughout the solution, while another part formed a liquid layer upon the aqueous solution. Upon analysis it was also found that the solution contained about 4% by weight of ammonium chloride which probably resulted from hydrolysis of hydrocyanic acid.

One hundred parts of the above solution was placed in a covered evaporator and heated until substantially all of the water and hydrochloric acid had evaporated. The temperature was then increased to 300° C., while a current of nitrogen gas was admitted to the gas space above the salts. Hydrocarbon gases, ammonia, water and hydrocyanic acid were liberated from the heated mass. The fluid salt mass was withdrawn from the evaporator, cooled and broken up. It was leached with dilute hydrochloric acid, the solid carbon therein filtered off and a clear, aqueous solution of salts obtained. The clear solution was returned to the catalyst chamber for synthesis of additional acrylonitrile.

The production capacities of the fresh, the spent and the reactivated catalyst solution were determined, as indicated by the results given below.

|  | Production Capacity g. Acrylonitrile Per Hr. Per Liter | Conversion to Acrylonitrile Based On— ||
|---|---|---|---|
|  |  | $C_2H_2$ | HCN |
|  |  | Percent | Percent |
| Freshly prepared catalyst solution | 12 | 78 | 89 |
| Spent catalyst solution | 7 | 70 | 85 |
| Reactivated catalyst solution | 12 | 77 | 89 |

The present process is economical, since it requires no chemical reagents other than hydrochloric acid and is convenient because by its use a catalytic salt solution of the proper composition may be conveniently recovered without resolution of the individual constituents thereof.

What I claim is:

1. A process for regenerating a spent acrylonitrile synthesis aqueous catalyst solution containing cuprous and alkali metal chlorides, together with liquid, tarry matter which comprises evaporating water present in the said solution, whereby a substantially dry salt mass comprising cuprous and alkali metal chlorides and liquid, tarry matter is obtained, heating the said salt mass in a non-oxidizing atmosphere to a temperature at which said liquid, tarry matter is converted to a solid carbonaceous material, dissolving said salt mass in water and separating the resulting solution from said solid carbonaceous material.

2. A process for regenerating a spent acrylonitrile synthesis aqueous catalyst solution containing cuprous and alkali metal chlorides, together with liquid, tarry matter which comprises evaporating water present in the said solution, whereby a substantially dry salt mass is obtained, heating said salt mass in a non-oxidizing atmosphere to a temperature at which contained liquid, tarry matter is converted to a solid carbonaceous material, dissolving said salt mass in water containing hydrochloric acid and separating said resulting solution from said solid carbonaceous material.

3. A process for regenerating a spent acrylonitrile synthesis aqueous catalyst solution containing cuprous and alkali metal chlorides, together with liquid, tarry matter which comprises evaporating water present in the said solution, whereby a substantially dry salt mass is obtained containing said tarry matter, heating the said evaporated salt mass in a non-oxidizing atmosphere to a temperature of at least 250° C. but below 400° C., dissolving the said heated salt mass in water and separating the resulting solution from contained solid carbonaceous material.

4. A process for regenerating a spent acrylonitrile synthesis aqueous catalyst solution containing cuprous and alkali metal chlorides, together with liquid, tarry matter which comprises evaporating water present in the said solution, whereby a substantially dry salt mass is obtained containing said tarry matter, heating said salt mass to a temperature of at least 250° C. but below 400° C. in a non-oxidizing atmosphere, dissolving the said salt mass in water and separating the resulting solution from contained solid carbonaceous material.

5. A process for treating a spent acrylonitrile synthesis aqueous catalyst solution containing cuprous and alkali metal chlorides, together with liquid, tarry matter which comprises evaporating water present in the said solution, whereby a substantially dry salt mass is obtained containing said tarry matter, heating said salt mass to a temperature of at least 250° C. but below 400° C. in a non-oxidizing atmosphere, cooling said salt mass, treating the salt mass with aqueous hydrochloric acid and separating the resulting solution from contained solid carbonaceous material.

6. A process for treating a spent acrylonitrile synthesis, aqueous catalyst solution containing cuprous and alkali metal chlorides together with liquid, tarry matter which comprises evaporating water present in the said solution, whereby a substantially dry salt mass is obtained containing said tarry matter, heating said salt mass to a temperature of at least 250° C. but below 400° C. in a non-oxidizing atmosphere, cooling said salt mass, treating the said salt mass with a compound selected from the group consisting of water and aqueous hydrochloric acid, and thereafter separating the resulting solution from contained solid carbonaceous material.

CARLYLE J. STEHMAN.

REFERENCES CITED

The following references are of record in the file of this patent:

UNITED STATES PATENTS

| Number | Name | Date |
|---|---|---|
| 1,185,499 | Grunstein | May 30, 1916 |
| 1,203,233 | Morrison | Oct. 31, 1916 |
| 1,915,152 | Calcott et al. | June 20, 1933 |